(12) United States Patent
Hatakeyama et al.

(10) Patent No.: US 7,251,348 B2
(45) Date of Patent: Jul. 31, 2007

(54) LAND APPEARANCE INSPECTING DEVICE, AND LAND APPEARANCE INSPECTING METHOD

(75) Inventors: Yukiko Hatakeyama, Tokyo (JP); Masahiko Nagano, Tokyo (JP)

(73) Assignee: NEC Corporation, Tokyo (JP)

( * ) Notice: Subject to any disclaimer, the term of this patent is extended or adjusted under 35 U.S.C. 154(b) by 654 days.

(21) Appl. No.: 10/471,834

(22) PCT Filed: Mar. 12, 2002

(86) PCT No.: PCT/JP02/02282

§ 371 (c)(1),
(2), (4) Date: Apr. 7, 2004

(87) PCT Pub. No.: WO02/073127

PCT Pub. Date: Sep. 19, 2002

(65) Prior Publication Data

US 2004/0156533 A1 Aug. 12, 2004

(30) Foreign Application Priority Data

Mar. 14, 2001 (JP) .............................. 2001-072713

(51) Int. Cl.
*G06K 9/00* (2006.01)

(52) U.S. Cl. ....................................... 382/109; 382/147

(58) Field of Classification Search ................. 380/100, 380/109, 147, 149, 150, 151; 250/306, 358.1, 250/559.34; 348/92
See application file for complete search history.

(56) References Cited

U.S. PATENT DOCUMENTS 5,161,202 A * 11/1992 Kitakado et al. ........... 382/147
6,278,797 B1 * 8/2001 Nagasaki et al. ........... 382/146

FOREIGN PATENT DOCUMENTS

| JP | 2502853 | 3/1996 |
| JP | 2502854 | 3/1996 |
| JP | 9-203620 | 8/1997 |
| JP | 2888829 | 2/1999 |

* cited by examiner

*Primary Examiner*—Samir Ahmed
*Assistant Examiner*—Abolfazl Tabatabai
(74) *Attorney, Agent, or Firm*—Young & Thompson (57) ABSTRACT

Land circle calculating means (7) calculates a land circle as an approximate circle from label information (S6). Land circle accuracy-enhancing means (8) calculates again the land circle by changing a mask angle if land circle candidate information (S7) obtained is improper, so as to enhance the accuracy of the land circle. AND operation means (11) carries out an AND operation of a land circle image (S9) and a binary image (S10) to create a land missing image (S11). In-land binary means (12) calculates an in-land defect image (S12) from an original image (S4). OR operation means (13) carries out an OR operation of the in-land missing image (S11) and the in-land defect image (S12) to create a land defect image (S13).

10 Claims, 10 Drawing Sheets

LAND APPEARANCE INSPECTING DEVICE, AND LAND APPEARANCE INSPECTING METHOD

BACKGROUND OF THE INVENTION

1. Field of the Invention

The present invention relates to a land appearance inspecting device and land appearance inspecting method for inspecting an appearance of an amorphous land whose shape is a circle with a protruding portion, such as an LGA (Land Grid Array).

2. Description of the Related Art

Previously, as a land inspecting method, for example, in Japanese unexamined patent publication no. 9-203620, a technique for inspecting a broken neck of a land has been disclosed. More specifically, a center position and radius of a through hole are calculated from image data, and image data of a region including a land is extracted on the basis of the center position and radius. And, on the basis of the extracted image data, an edge of a wiring pattern is resolved and extracted for each predetermined direction component as edge image data, and a shape corresponding to a broken wiring portion is recognized on the basis of a plurality of the extracted edge image data, and a broken neck is determined on the basis of the recognized result.

Also, a technique has been disclosed in, for example, Japanese patent nos. 2502853 and 2502854, in which a wiring pattern and through hole portion are separated from image data, and the through hole portion of the wiring pattern is filled, while arbitrary amount expansion processing is applied to the separated through hole image, and logical operation is performed thereon with the filled binary image, whereby a discrepancy portion is detected as a defect of a land portion of the through hole.

By the way, in integrated circuits, amorphous shape lands are arranged at an equal pitch in a grid form on a package (PKG) reverse surface, which is called an LGA (Land Grid Array). The shape of a land in the LGA has a feature of an amorphous circle with a protruding portion. Since the land has an aligned appearance, position angle inspection (inspection of coordinate position accuracy of a circular portion) is required for mounting, while it is important to detect a foreign body, flaw, and break on the land caused by a resistor failure, contact error and the like.

However, the prior techniques are designed for inspection of the land disposed on a general substrate, and consequently it is substantially impossible to apply them to inspection of the reverse side of an IC called the LGA. Even if the prior land inspecting methods are applied to land inspection of the LGA, detected position accuracy is low, while no break (chip) can be detected in shape inspection.

SUMMARY OF THE INVENTION

In view of the foregoing, it is an object of the invention to provide a land appearance inspecting device and land appearance inspecting method capable of enhancing detection position accuracy of an amorphous land whose shape is a circle with a protruding portion, while detecting a land break in shape inspection.

To solve the above-described problems, the invention of claim 1 is characterized by comprising: binarizing means, whereby an input image read by scanning a measurement object pattern with a photoelectric conversion scanner is converted into a binarized image; land circle calculating means for calculating a land circle which approximates a land shape from the binarized image converted by said binarizing means; and land circle accuracy enhancing means for calculating a land circle which minimizes an error of the land circle calculated by said land circle calculating means; wherein land coordinates of an amorphous land with a protrusion portion are detected with high accuracy, based on the land circle calculated by said land circle accuracy enhancing means.

Also, the invention of claim 2 is characterized by comprising: in the land appearance inspection device of claim 1, land defect detection means for detecting a land internal defect and land circumferential break, based on the land circle calculated by said land circle accuracy enhancing means; and determination means for determining land quality, based on the land internal defect and land circumferential break results detected by said land defect detection means.

Also, the invention of claim 3 is characterized by comprising: in the land appearance inspection device of claim 1, land internal binarization means for extracting a land internal defect, based on the land circle calculated by said land circle calculating means.

Also, the invention of claim 4 is characterized by comprising: in the land appearance inspection device of claim 3, land external defect detection means for detecting a land circumferential break, based on the land circle calculated by said land circle accuracy enhancing means and the land internal defect extracted by said land internal binarization means.

Also, the invention of claim 5 is characterized by comprising: in the land appearance inspection device of claim 1, land area calculation means for calculating land area based on the binarized image converted by said binarizing means; land circle area calculation means for calculating land circle area based on the land circle calculated by said land circle accuracy enhancing means; and land protrusion portion area calculation means for calculating a proportion of land protrusion portion area, based on the land area calculated by said land area calculation means and the land circle area calculated by said land circle area calculation means.

To solve the above-described problems, the invention of claim 6 is characterized by comprising the steps of: binarizing an input image read by scanning a measurement object pattern with a photoelectric conversion scanner; calculating a land circle which approximates a land shape from the binarized image; calculating a land circle which minimizes an error of said land circle; and detecting land coordinates of an amorphous land with a protrusion portion, based on said land circle.

Also, the invention of claim 7 is characterized in that: in the land appearance inspection method of claim 6, a land internal defect and land circumferential break are detected, based on said land circle.

Also, the invention of claim 8 is characterized in that: in the land appearance inspection method of claim 6, a land internal defect is extracted, based on said land circle.

Also, the invention of claim 9 is characterized in that: in the land appearance inspection method of claim 8, a land circumferential break is detected, based on said land circle and said land internal defect.

Also, the invention of claim 10 is characterized in that: in the land appearance inspection method of claim 6, land area is calculated based on said binarized image; land circle area is calculated based on said land circle; and a proportion of land protrusion portion area is calculated based on said land area and said land circle area.

In this invention, a land circle which approximates a land shape from a binarized image converted by a binarizing means is calculated by a land circle calculating means, and a land circle which minimizes an error of the land circle calculated by the land circle calculating means is calculated by a land circle accuracy enhancing means. Accordingly, it is possible to enhance detection position accuracy of a land with an amorphous shape of a circle with a protrusion portion, and to detect a land break in shape inspection.

DETAILED DESCRIPTION OF THE PREFERED EMBODIMENTS

Embodiments of the present invent ion will hereinafter be explained by use of the accompanying drawings.

A. The Structure of the Embodiment

Figure 1:
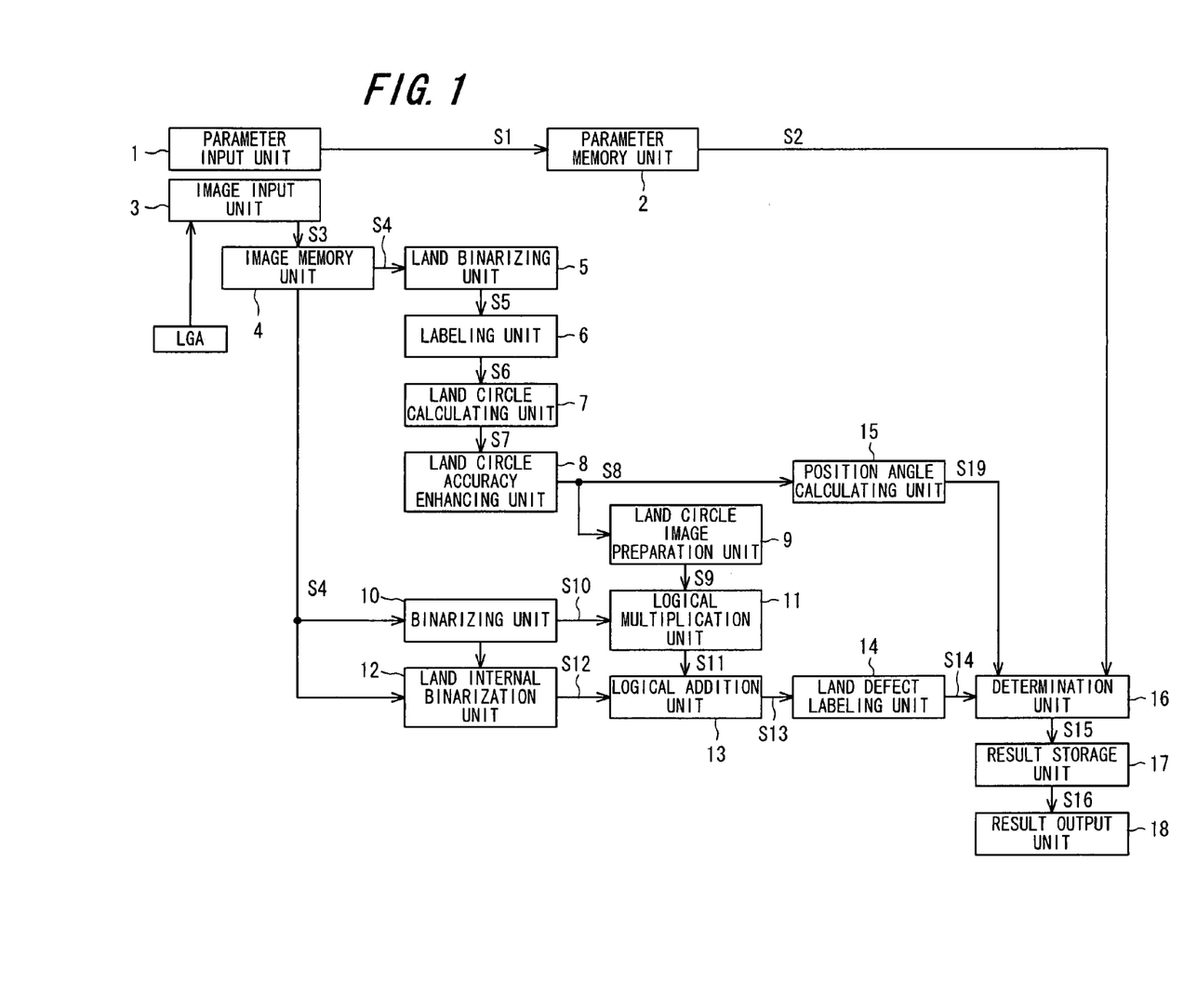
FIG. 1 is a block diagram showing an overall system configuration in accordance with an embodiment of the present invention.

FIG. 1 is a block diagram showing an overall system configuration in accordance with an embodiment of the present invention. In FIG. 1, a parameter input unit 1 inputs parameters required for inspection, converts them into a parameter signal S1 and feeds it to a parameter memory unit 2. The parameter memory unit 2 stores the parameter signal S1 and feeds it to a determination unit 16 as parameter information S2.

An image input unit 3 converts an LGA into an original image signal S3, and feeds it to an image memory unit 4. The image memory unit 4 digitizes the original image signal S3 and stores it as an original image S4. If the original image S4 is larger than a land binarization level of the parameter information S2, a land binarizing unit 5 binarizes the original image S4 into "1", or else "0", and feeds it to a labeling unit 6 as a binary image S5. The labeling unit 6 performs labeling processing on the binary image S5, and feeds the circumferential coordinates and centroids of all labels to a land circle calculating unit 7 as XY-coordinate system label information S6. The above-mentioned labeling processing refers to processing of grouping a set of adjacent pixels evaluatable as one figure on the binary image, but, in the present embodiment, further involves calculating features such as figure's area, length, circumferential length, circumferential coordinates, centroid and the like.

The land circle calculating unit 7 calculates a land circle from the label information S6 as an approximating circle, and feeds estimates, radius and center coordinates to a land circle accuracy enhancing unit 8 as land circle nomination information S7. The land circle accuracy enhancing unit 8 evaluates whether the land circle nomination information S7 obtained is an adequate land circle or not, and, when inadequate, alters a mask angle of the parameter information S2, re-calculates a land circle, and feeds it to a land circle image preparation unit 9 and a position angle calculating unit 15 as land circle information S8.

The land circle image preparation unit 9 feeds to a logical multiplication unit 11a land circle image S9, whose circle and inside narrowed by offset of the parameter information S2 from the land circle information S8 are "1", or else "0". Also, if the original image S4 is larger than a land internal binarization level of the parameter information S2, a binarizing unit 10 binarizes the original image S4 into "0", or else "1", prepares a binary image S10, and feeds it to the logical multiplication unit 11. The logical multiplication unit 11 takes logical multiplication of the land circle image S9 and the binary image S10, prepares a land break image S11, and feeds it to a logical addition unit 13.

Also, if the label inside of the original image S4 is larger than a land internal binarization level of the parameter information S2, a land internal binarization unit 12 binarizes the label inside of the original image S4 into "0", or else "1", and feeds it to the logical addition unit 13 as a land internal defect image S12. The logical addition unit 13 takes logical addition of the land break image S11 and the land internal defect image S12, prepares a land defect image S13, and feeds it to a land defect labeling unit 14.

The land defect labeling unit 14 applies labeling processing to the land defect image S3, and feeds it to the determination unit 16 as land defect label information S14. The position angle calculating unit 15 calculates position angle information S19 from the land circle information S8, and feeds it to the determination unit 16. The position angle information S19 is information indicating deviation of an actual measured land position from a designed position. Specifically, actual measured land circle center coordinates (X, Y: included in the land circle information S8) are compared with designed land position coordinates (X, Y) to which land overall position amendment (X, Y, θ) is made, and an Euclid distance that is the shortest distance is calculated from X-deviation and Y-deviation, and which is coordinate deviation, i.e. the position angle information S19.

The determination unit 16 determines the quality of the coordinate deviation of the land on the basis of the position angle information S19. Namely, if the coordinate deviation of the land is within a tolerance (± tolerance value), a pass is evaluated. Also, the determination unit 16 determines the land defect label information S14 by a land defect determination parameter of the parameter information S2, prepares land defect information S15, and feeds it to a result storage unit 17. The result storage unit 17 stores the land defect information S15 as an inspection result, and feeds it to a result output unit 18 as a land defect signal S16. The result output unit 18 outputs the land defect signal S16 to a display, RS232C, network, etc.

B. The Operation of the Embodiment

Next, the overall operation of the present embodiment will be explained in detail.

Figure 2:
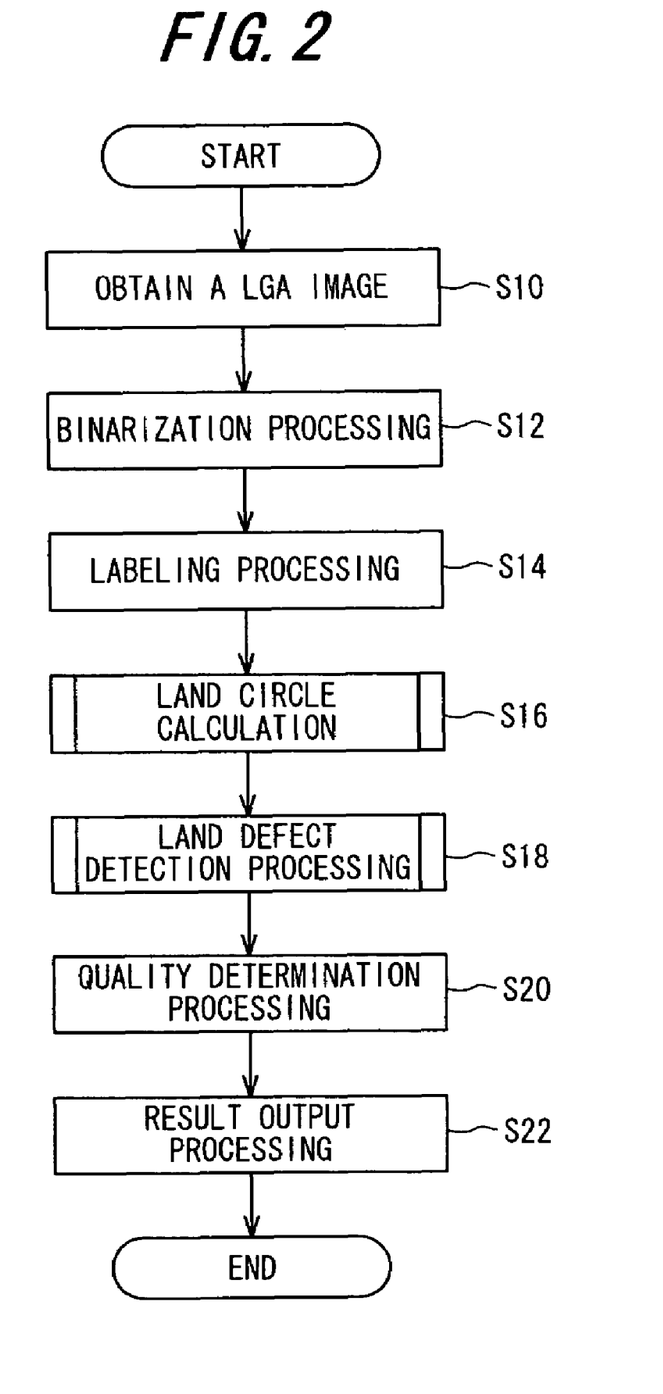
FIG. 2 is a flow chart for explaining the overall operation of the present embodiment.

Here, FIG. 2 is a flow chart for explaining the overall operation of the present embodiment. First, an LGA image is obtained by the image input unit 3, converted into an original image S4 and stored to the image memory unit 4 (S10). Next, if the original image S4 is larger than a land binarization level of parameter information S2 stored in the parameter memory unit 2 beforehand by the parameter input unit 1, it is binarization-processed by the land binarizing unit 5 into "1", or else "0" (S12). Next, a binary image S5 obtained is labeling-processed by the labeling unit 6 to calculate the circumferential coordinates and centroids of individual labels as label information S6 (S14).

Next, a land circle that is an approximating circle is calculated from the label information S6 by the land circle calculating unit 7 to obtain land circle nomination information S7, and land circle information S8 is calculated from the land circle nomination information S7 by the land circle accuracy enhancing unit 8 (S16). Next, land defect detection processing is performed for detecting a land internal defect and land circumferential break (S18). Thereafter, based on a result obtained, quality determination is performed by the determination unit 16 (S20), and the result obtained is output by the result output unit 18 to a display, RS232C, network, etc. (S22).

Figure 3:
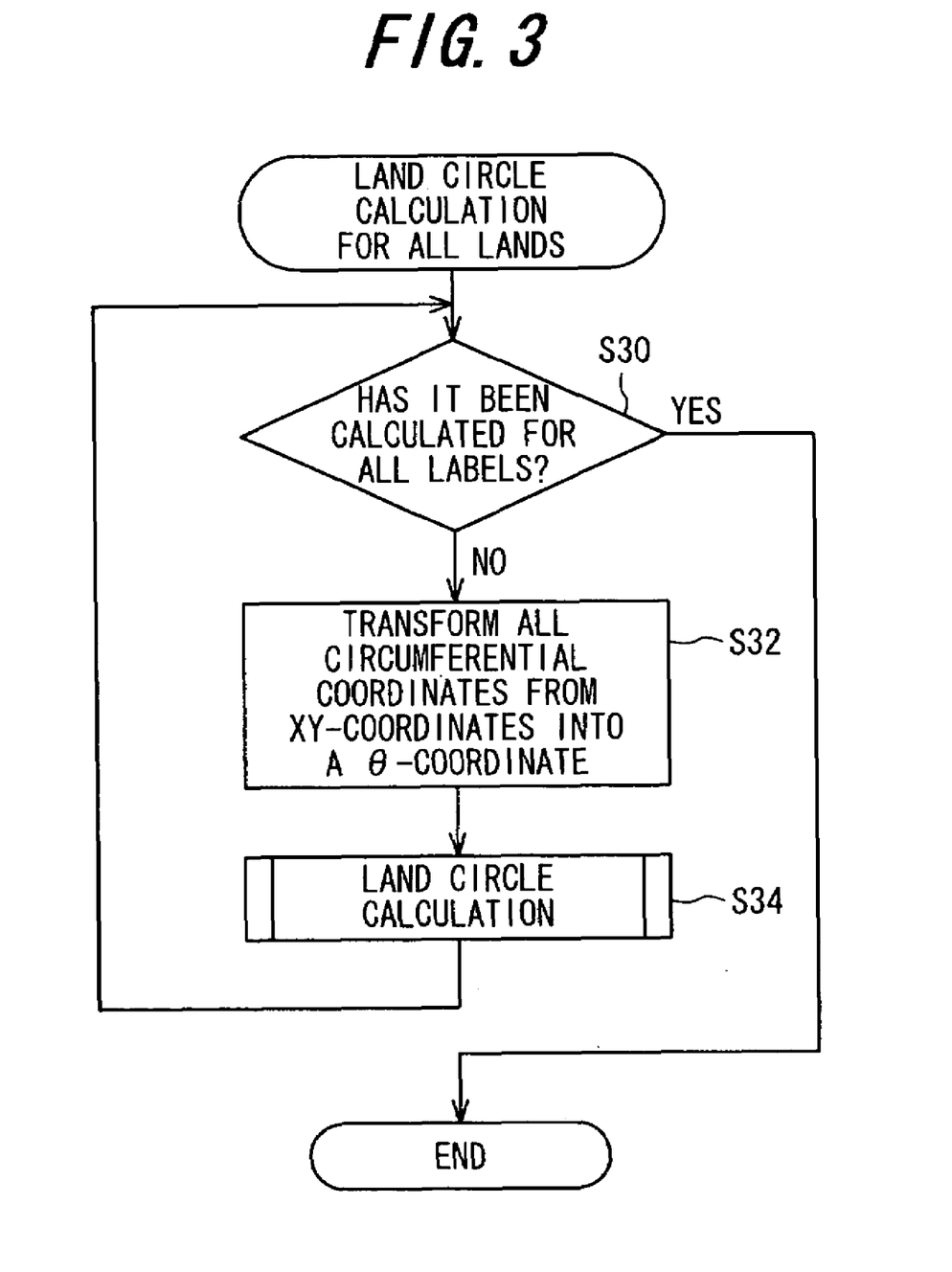
FIG. 3 is a flow chart for explaining the operation of the land circle calculation processing for all lands.

Next, the operation of the above-mentioned land circle calculation processing in step S16 will be explained in detail. Here, FIG. 2 is a flow chart for explaining the operation of the land circle calculation processing for all lands. The land circle calculation is performed for individual labels by using the circumferential coordinates and label centroid of each label information S6 calculated in the labeling unit 6.

Figure 6:
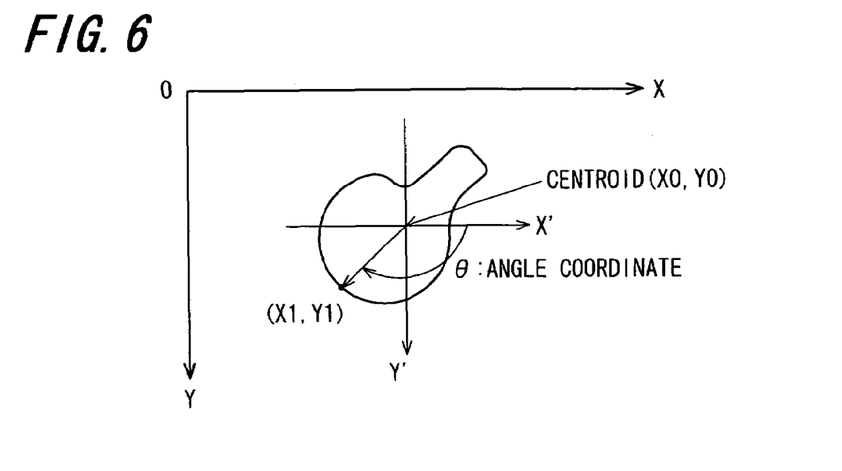
FIG. 6 is a pattern diagram for explaining the transformation from XY-coordinates of land circumferential coordinates to an angle coordinate θ.

First, whether the land circle calculation is performed or not for all labels is evaluated (S30). If it has not been completed, as preprocessing of the land circle calculation, as shown in FIG. 6, the circumferential coordinates are transformed from an XY-coordinate system to an angle coordinate $\theta$ ($0 \leq \theta < 2\pi$) in which a label centroid is centered (S32). Next, the land circle calculation is performed from a mask angle and division number of the angle coordinate $\theta$ and parameter information S2 (S34). And, if the land circle calculation is performed for all labels, it ends.

Figure 4:
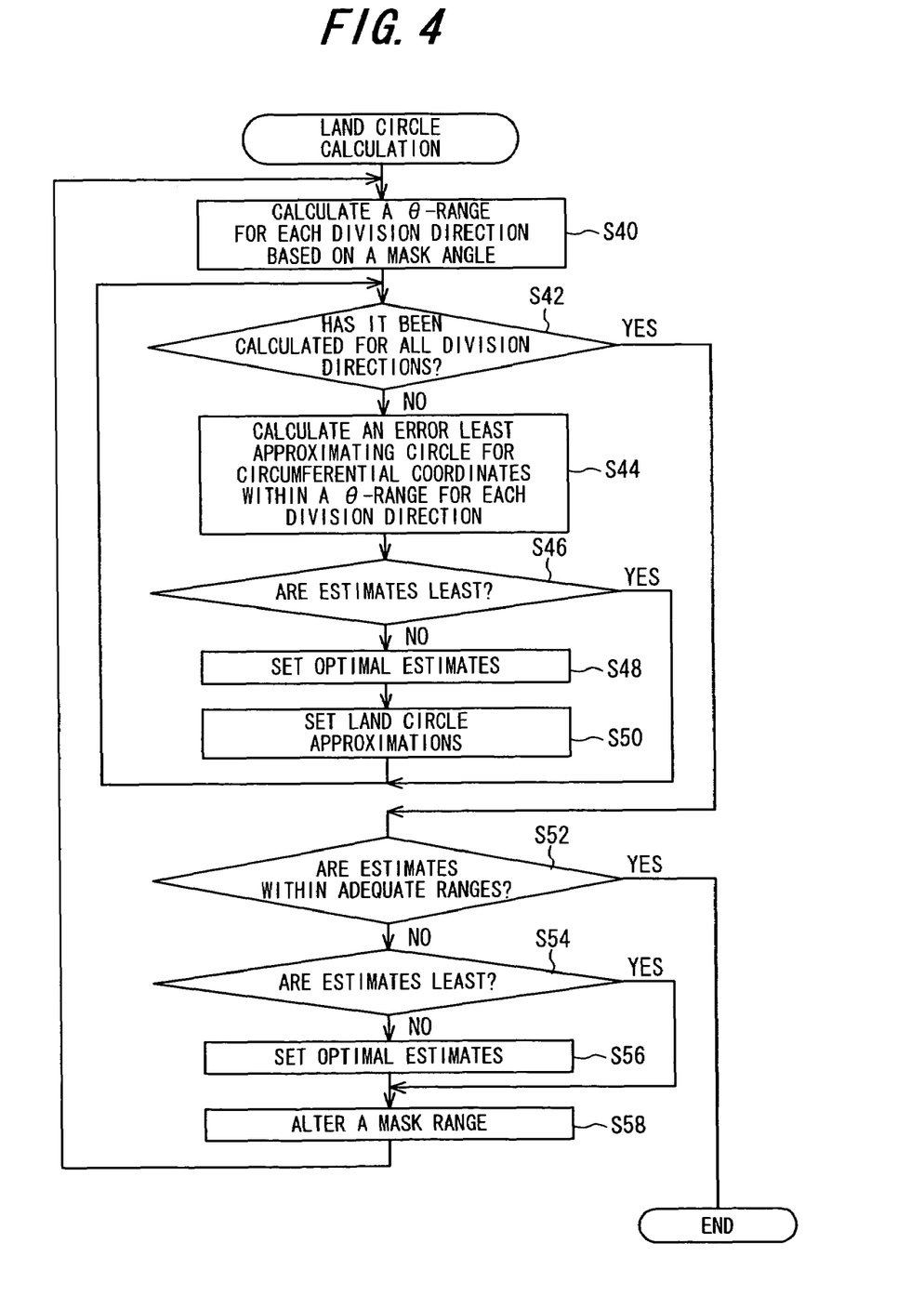
FIG. 4 is a flow chart for explaining the operation of the land circle calculation processing.
Figure 8:
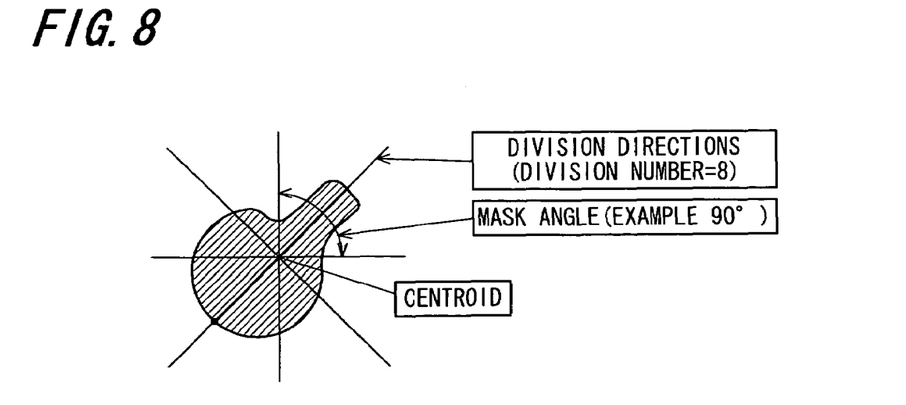
FIG. 8 is a pattern diagram illustrating a radially divided region where a centroid is centered.

Next, the operation of the above-mentioned land circle calculation processing in step S34 will be explained further in detail. Here, FIG. 4 is a flow chart for explaining the operation of the land circle calculation processing. First, as shown in FIG. 8, the circumferential angle coordinate $\theta$ is divided to set a mask range centered in a division direction for each division direction (S40). The mask range is given by the mask angle of parameter information S2, and circumferential coordinates with a circumferential angle coordinate $\theta$ belonging to this range are not used in the calculation of an approximating circle. Next, if it has not been calculated for all division directions, circumferential coordinates outside the mask range are selected from the circumferential angle coordinate $\theta$ for each division direction to select an approximating circle which minimizes an error and obtain estimates that represent center coordinates, radius and approximation accuracy (S44). This operation is performed for all division directions to set an approximating circle which minimizes estimates to be a land circle (S46, S48, S50).

Here, a supplementary explanation is provided with respect to the calculation processing of the approximating circle. The approximating circle is calculated basically by a least-squares method from the circumferential coordinates and centroid obtained by the labeling processing. But since the shape of the land in the LGA has the feature of a circle with a protruding portion, if the least-squares method is simply applied to the entire circumferential length, only a circular portion cannot be detected. The best way is to apply the least-squares method to a figure with the protruding portion excluded, but the protrusion direction of the land in the LGA is irregular, and the number of the lands is large, therefore holding as input information before hand is an intricate and difficult task. Accordingly, in the present embodiment, in order to allow an optimal approximating circle to be detected irrespective of the position of the protrusion, a method is employed in which a mask is applied to a portion in which the protrusion is assumed to be present, and an approximating circle is calculated with circumferential coordinates except it. Because the portion in which the protrusion is present is assumed to be in 8 directions in which the land circular portion is centered, the approximating circle is calculated 8 times individually by changing the mask application direction. Of the 8 approximating circles obtained, the least error circle is set to be an optimal approximating circle, and the direction of the mask which is then applied is set to be a protrusion direction in which the protrusion portion is present.

In the above-described approximating circle calculation processing, in order to apply a mask radially in 8 directions in which a centroid is centered, XY-coordinates of the circumferential coordinates are transformed into a $\theta$-coordinate in which a centroid is centered. The mask is one of the parameter information input in the parameter input unit beforehand as the mask angle. The significant feature of this calculation method is that the optimal approximating circle is calculated, while at the same time the protrusion direction can automatically be detected. That is, it is possible to detect the land circular portion irrespective of the size and location of the protruding portion, and the size of the circular portion.

Figure 10:
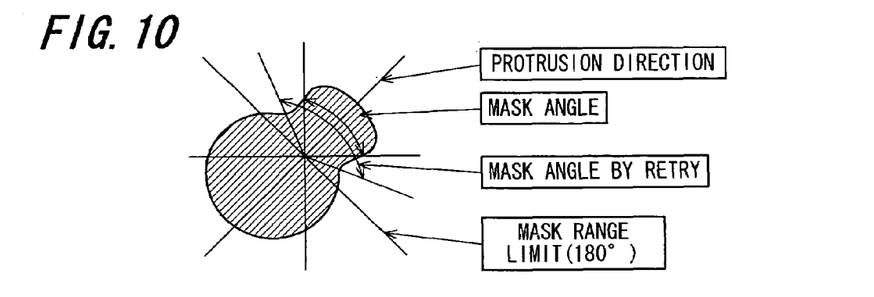
FIG. 10 is a pattern diagram showing steps for enhancing land circle accuracy.

By the way, in the event of the presence of a break due to a foreign body, flaw or the like on the land, the shape of the land is distorted by some cause, which deteriorates land circle accuracy. In this case, as shown in FIG. 10, based on estimates, steps are taken to enhance land circle accuracy. That is, the adequacy of the approximating circle obtained based on estimates is evaluated (S52), and if they are within adequate ranges, determination is then made and the processing ends. On the other hand, if the estimates are outside the adequate ranges, a mask angle centered in a division direction is increased step by step (S58), the factor which distorts the shape of the land is eliminated, and land circle calculation is re-performed (S40-S50). If the estimates are within the adequate ranges, a land circle is set, but even when the mask angle reaches a mask range limit illustrated in FIG. 10, if not within the adequate ranges, an approximating circle which minimizes the estimates calculated so far is selected and set as a land circle. The division direction obtained is a protrusion direction, and is center coordinates, radius and estimates as the land circle information.

Figure 7:
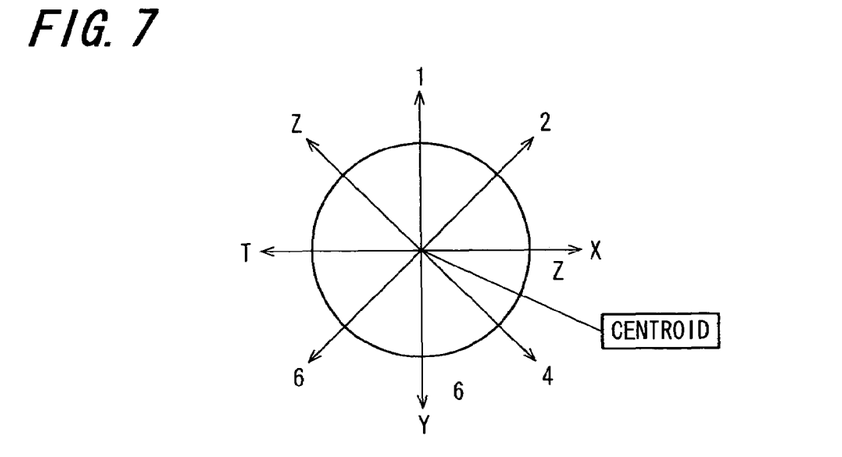
FIG. 7 is a pattern diagram for explaining a protrusion direction.
Figure 9:
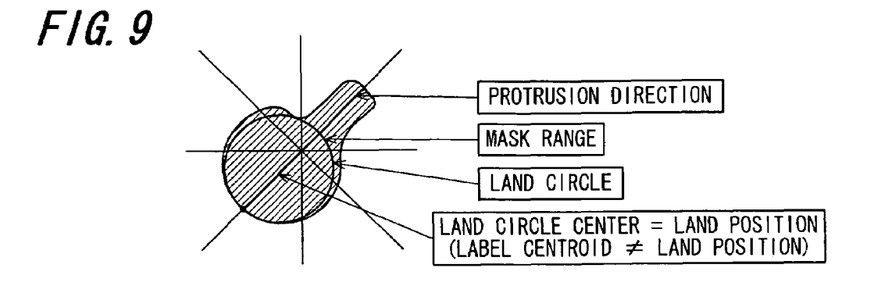
FIG. 9 is a pattern diagram illustrating a land circle calculation result.

FIG. 7 illustrates an example of setting a protrusion direction in the case of division number "8". Also, FIG. 9 illustrates a pattern diagram of a land circle calculation result example. Since the shape of the land has the feature of a circular portion with a protruding portion, the center of the land circle basically does not coincide with the label centroid.

Figure 5:
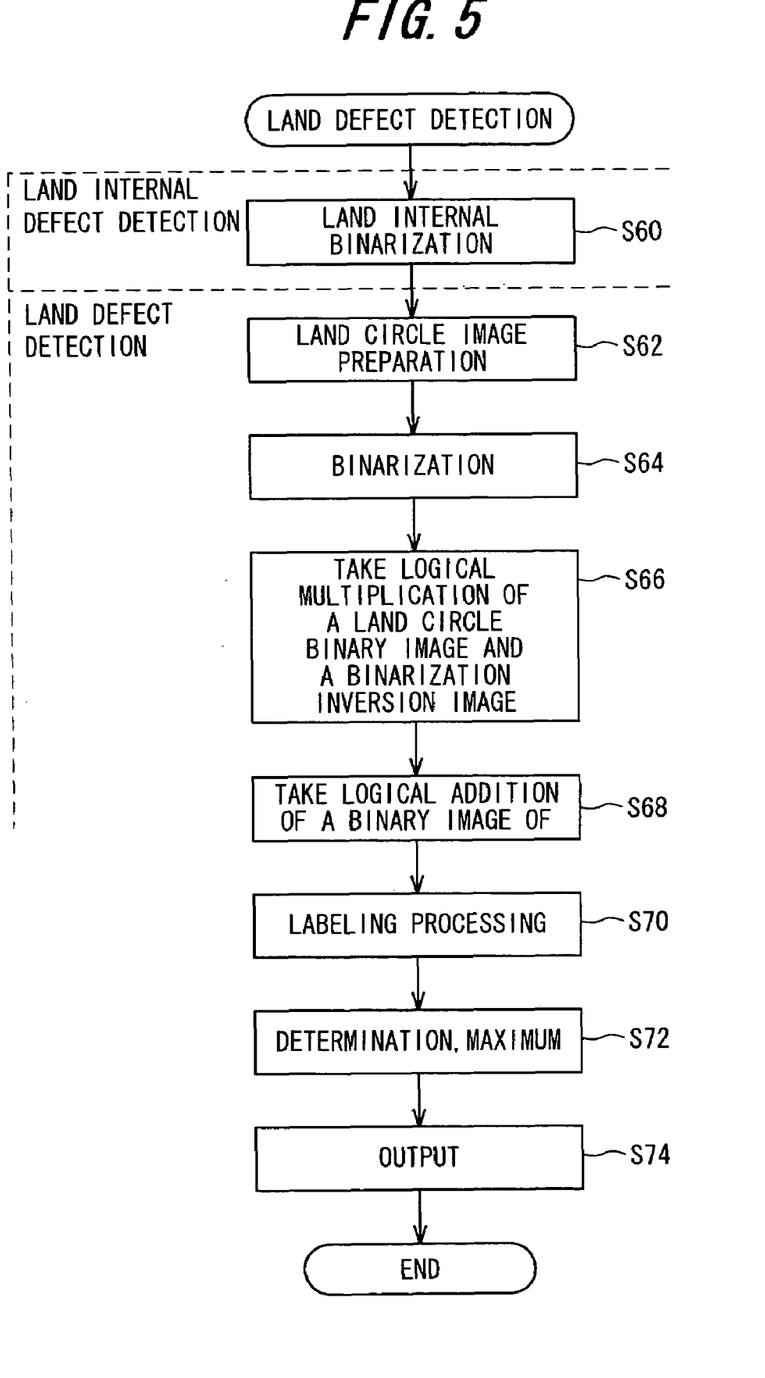
FIG. 5 is a flow chart for explaining the operation of the land defect detection processing.
Figure 11:
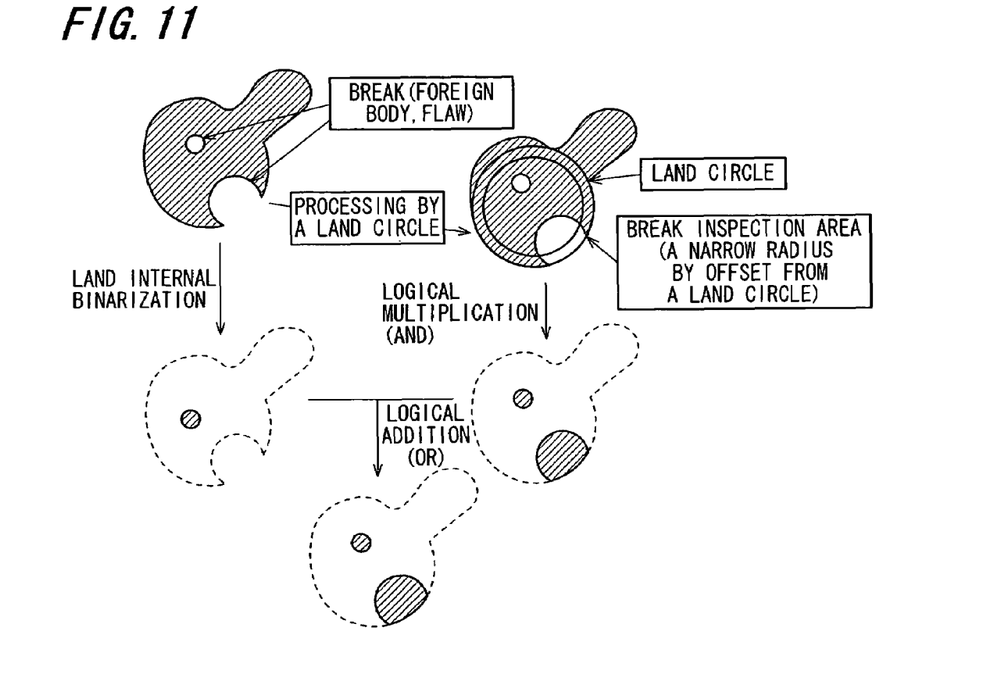
FIG. 11 is a pattern diagram illustrating land internal defect detection.

Next, the above-mentioned land defect detection processing in step S18 will be explained in detail. Here, FIG. 5 is a flow chart for explaining the operation of the land defect detection processing. Also, FIG. 11 is a pattern diagram for explaining a series of flow of land internal defect detection processing. First, land internal binarization is performed from an original image and label information (S60). That is, if smaller than a land internal binarization level, it is "1" or else "0". Also, background except the land is "0". Next, based on land circle information obtained, a land circle image is prepared (S62). That is, a narrow radius and inside of the land circle whose radius is narrowed by offset of the parameter information S2 are "1", or else "0".

Next, the original image is binarized by the land internal binarization level (S64). That is, if smaller than the land internal binarization level, it is "1" or else "0". Similar processing is performed also on background except the land. Next, logical multiplication of this binary image and land circle image is taken to extract a figure which is a nomination of land break portion (S66). The figure obtained is a land break image. Next, logical addition of the land break image and the land internal binary image is taken to obtain a land defect image (S68). Next, labeling processing is applied to the land defect image (S70), and determination is made to label information obtained to detect a land defect (S72), and output (S74).

C. Other Embodiments

Next, other embodiments of the present invention will be explained.

C-1. The First Other Embodiment

Figure 12:
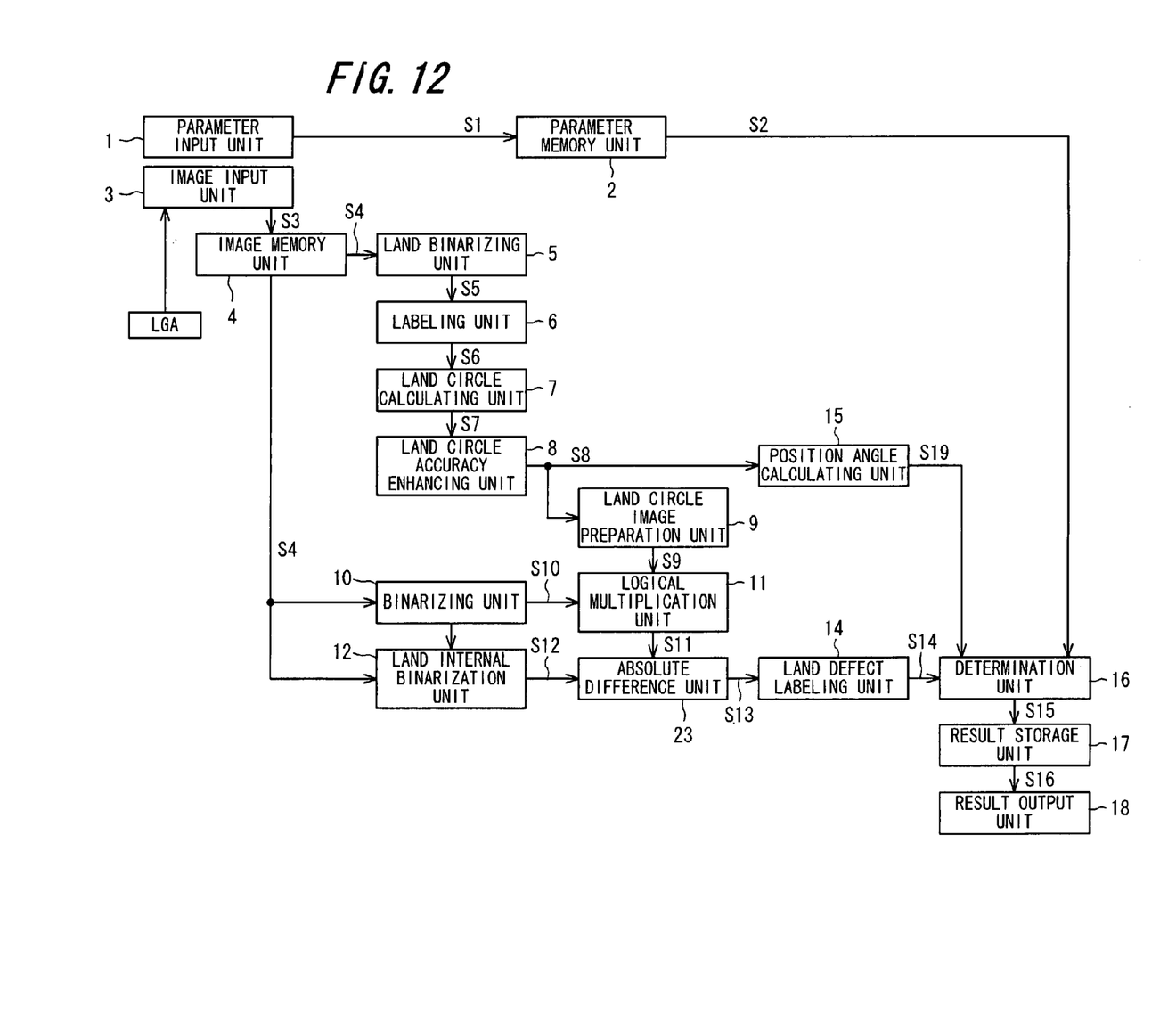
FIG. 12 is a block diagram showing a system configuration in accordance with the first other embodiment of the present invention.

FIG. 12 is a block diagram showing a configuration of the first other embodiment of the present invention. Here, to portions corresponding to those of FIG. 1, the same characters are added, and their explanations omitted. The first other embodiment is characterized in that, by substituting an absolute difference unit 23 for the logical addition 13 shown in FIG. 1, only a defect due to a break present in the circumference of the LGA land is discriminated and detected as a land defect image. If subtraction of a land internal defect image S12 from a land defect image S11 results in a minus, the absolute difference unit 23 outputs "0" as a land defect image S13.

C-2. The Second Other Embodiment

Figure 13:
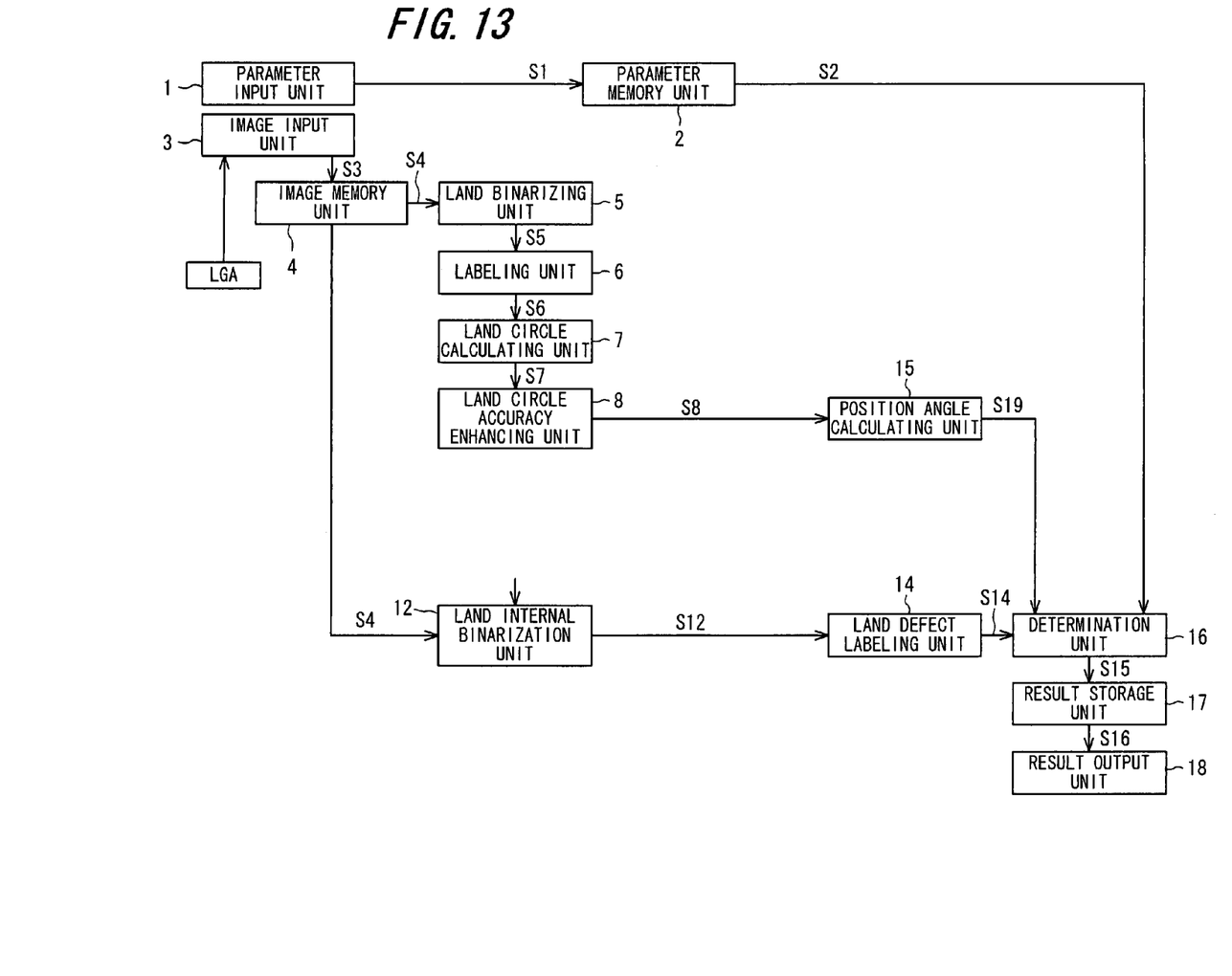
FIG. 13 is a block diagram showing a system configuration in accordance with the second other embodiment of the present invention.

FIG. 13 is a block diagram showing a configuration of the second other embodiment of the present invention. Here, to portions corresponding to those of FIG. 1 or FIG. 12, same characters are added and their explanations omitted. In the second other embodiment, by deleting the land circle image preparation unit 9, binarizing unit 10, logical multiplication unit 11, and logical addition unit 13 shown in FIG. 1, only a land internal defect can be discriminated and detected.

C-3. The Third Other Embodiment

Figure 14:
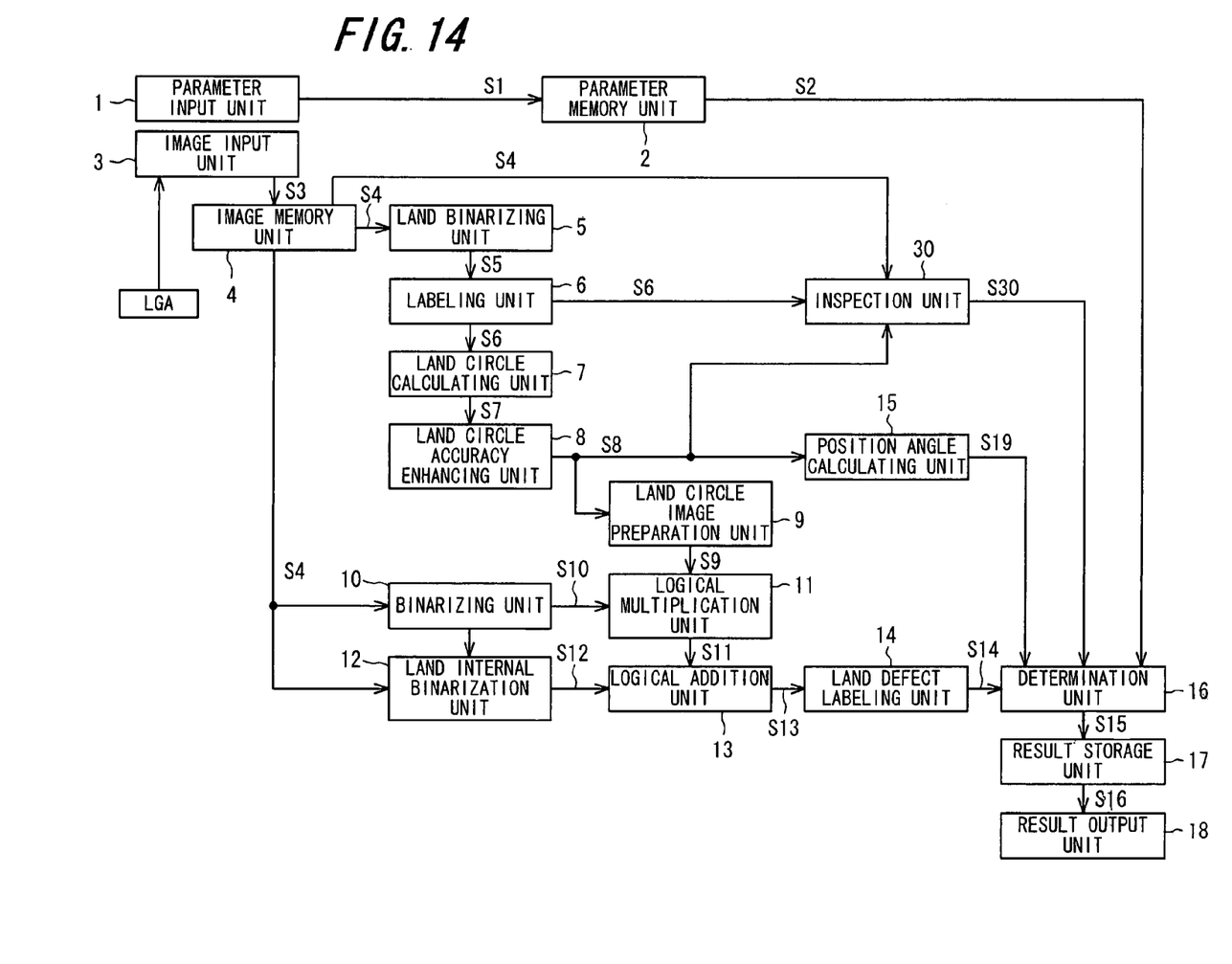
FIG. 14 is a block diagram showing a system configuration in accordance with the third other embodiment of the present invention.

FIG. 14 is a block diagram showing a configuration of the third other embodiment of the present invention. Here, to portions corresponding to those of FIG. 1, same characters are added and their explanations omitted. In the third other embodiment, by adding an inspection unit 30 to the configuration shown in FIG. 1, shades are inspected from an original image S4 and label information S6, and fed to a determination unit 16 as detection information S30. The determination unit 16 determines the detection information S30 by determination parameters of parameter information S2, and outputs land defect information S15. Also, in the inspection unit 30, from label information S6 and land circle information S8, {(label area−land circle area)/land circle area} is calculated so that a proportion of protrusion portion area can be detected and determined. Also, of the land circle information S8, estimates are a guide of whether a land shape is in the form of deviation from a land circle, so that the quality of the shape can be determined.

As explained above, according to the present invention, a land circle which approximates a land shape from a binarized image converted by a binarizing means is calculated by a land circle calculating means, and a land circle which minimizes an error of the land circle calculated by the land circle calculating means is calculated by a land circle accuracy enhancing means, so that land coordinates of an amorphous land with a protrusion portion can be detected with high accuracy, which is an advantage.

Also, based on the land circle calculated by the land circle accuracy enhancing means, a land internal defect and land circumferential break are detected by a land defect detection means, and based on the land internal defect and land circumferential break results detected by the land defect detection means, land quality is determined by a determination means, so that land defects due to a foreign body, flaw, break, etc., in a land with an amorphous shape of a circle with a protrusion portion can be detected simultaneously, which is an advantage.

Also, only a land internal defect is extracted by a land internal binarization means, so that only a land internal foreign body and flaw can be discriminated from a land circumferential break and detected, which is an advantage.

Also, based on the land circle calculated by the land circle accuracy enhancing means and the land internal defect extracted by the land internal binarization means, a land circumferential break is detected by land external defect detection, so that only the LGA land circumferential break can be discriminated from the LGA land internal defect due to a foreign body/flaw and detected, which is an advantage.

Also, based on the binarized image converted by the binarizing means, land area is calculated by a land area calculation means, and based on the land circle calculated by the land circle accuracy enhancing means, land circle area is calculated by a land circle area calculation means, and based on the land area and the land circle area, a proportion of land protrusion portion area is calculated by a land protrusion portion area calculation means, so that land shape quality can be determined, based on protrusion portion area quality, which is an advantage.

What is claimed is:

1. A land appearance inspection device, comprising:
   binarizing means, whereby an input image read by scanning a measurement object pattern with a photoelectric conversion scanner is converted into a binarized image;
   land circle calculating means for calculating a land circle which approximates a land shape from the binarized image converted by said binarizing means; and
   land circle accuracy enhancing means for calculating a land circle which minimizes an error of the land circle calculated by said land circle calculating means; wherein
   land coordinates of an amorphous land with a protrusion portion are detected with high accuracy, based on the land circle calculated by said land circle accuracy enhancing means.

2. A land appearance inspection device according to claim 1, further comprising:
   land defect detection means for detecting a land internal defect and land circumferential break, based on the land circle calculated by said land circle accuracy enhancing means; and
   determination means for determining land quality, based on the land internal defect and land circumferential break results detected by said land defect detection means.

3. A land appearance inspection device according to claim 1, further comprising:
   land internal binarization means for extracting a land internal defect, based on the land circle calculated by said land circle calculating means.

4. A land appearance inspection device according to claim 3, further comprising:
   land external defect detection means for detecting a land circumferential break, based on the land circle calculated by said land circle accuracy enhancing means and the land internal defect extracted by said land internal binarization means.

5. A land appearance inspection device according to claim 1, further comprising:
   land area calculation means for calculating land area based on the binarized image converted by said binarizing means;
   land circle area calculation means for calculating land circle area based on the land circle calculated by said land circle accuracy enhancing means; and
   land protrusion portion area calculation means for calculating a proportion of land protrusion portion area, based on the land area calculated by said land area calculation means and the land circle area calculated by said land circle area calculation means.

6. A land appearance inspection method, comprising the steps of:
   binarizing an input image read by scanning a measurement object pattern with a photoelectric conversion scanner;
   calculating a land circle which approximates a land shape from the binarized image;
   calculating a land circle which minimizes an error of said land circle; and
   detecting land coordinates of an amorphous land with a protrusion portion, based on said land circle.

7. A land appearance inspection method according to claim 6, wherein a land internal defect and land circumferential break are detected, based on said land circle.

8. A land appearance inspection method according to claim 6, wherein a land internal defect is extracted, based on said land circle.

9. A land appearance inspection method according to claim 8, wherein a land circumferential break is detected, based on said land circle and said land internal defect.

10. A land appearance inspection method according to claim 6, wherein:
   land area is calculated based on said binarized image;
   land circle area is calculated based on said land circle; and
   a proportion of land protrusion portion area is calculated based on said land area and said land circle area.

* * * * *